(12) United States Patent
Brown

(10) Patent No.: US 7,849,309 B1
(45) Date of Patent: Dec. 7, 2010

(54) METHOD OF SECURING NETWORK ACCESS RADIO SYSTEMS

(75) Inventor: Sanford Brown, Bridgewater, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1397 days.

(21) Appl. No.: 11/299,348

(22) Filed: Dec. 9, 2005

(51) Int. Cl.
H04L 29/06 (2006.01)
H04L 29/02 (2006.01)

(52) U.S. Cl. .................................. 713/162; 713/168

(58) Field of Classification Search ............... 380/59, 380/270–273; 726/3–4; 455/404.1, 404.2, 455/414.1, 414.2, 414.3, 414.4, 456.6, 466, 455/458–459, 461, 507, 517–519, 352–353; 340/539.1, 539.16, 539.17, 5.64, 10.51; 713/162, 713/168
See application file for complete search history.

(56) References Cited

U.S. PATENT DOCUMENTS

| | | | |
|---|---|---|---|
| 5,392,357 A | 2/1995 | Bulfer et al. | |
| 5,689,566 A | 11/1997 | Nguyen | |
| 5,805,807 A | 9/1998 | Hanson et al. | |
| 6,081,601 A | 6/2000 | Raivisto | |
| 6,151,628 A | 11/2000 | Xu et al. | |
| 6,185,689 B1 | 2/2001 | Todd, Sr. et al. | |
| 6,189,032 B1 | 2/2001 | Susaki et al. | |
| 6,226,674 B1 | 5/2001 | Klish | |
| 6,418,324 B1 | 7/2002 | Doviak et al. | |
| 6,480,480 B1 | 11/2002 | Du | |
| 6,480,957 B1 | 11/2002 | Liao et al. | |
| 6,577,274 B1 | 6/2003 | Bajikar | |
| 6,594,305 B1 | 7/2003 | Roeck et al. | |
| 6,640,098 B1 * | 10/2003 | Roundtree | 455/414.2 |
| 6,711,678 B2 | 3/2004 | Ferguson | |
| 6,851,050 B2 | 2/2005 | Singhal et al. | |
| 6,915,124 B1 | 7/2005 | Kiessling et al. | |
| 6,922,557 B2 | 7/2005 | Fantaske | |
| 6,928,291 B2 | 8/2005 | Yiu et al. | |
| 6,940,849 B2 | 9/2005 | Eichen et al. | |
| 6,944,760 B2 | 9/2005 | Wills | |
| 6,944,772 B2 | 9/2005 | Dozortsev | |
| 6,961,541 B2 | 11/2005 | Overy et al. | |
| 2004/0048623 A1 * | 3/2004 | Flannery | 455/456.6 |
| 2005/0002419 A1 * | 1/2005 | Doviak et al. | 370/466 |
| 2005/0235340 A1 * | 10/2005 | To | 726/3 |

* cited by examiner

Primary Examiner—Gilberto Barron, Jr.
Assistant Examiner—Venkat Perungavoor
(74) Attorney, Agent, or Firm—Hoffmann & Baron, LLP

(57) ABSTRACT

A method of providing security for network access radio systems and associated access radio security systems used with the systems. The method includes connecting an access radio having a radio link to a network; communicating between the access radio and a computer over the network using a ping application having ping commands and unique encrypted codes; and enabling operation of the access radio when the access radio is receiving ping commands. Typically, the access radio and the computer are nodes on the network and the network is a local area network (LAN). The ping application sends packets of information from the computer to the access radio and receives a response from the access radio. The ping application must be functioning (i.e., sending and receiving commands between the computer and the access radio) to enable the access radio to communicate via the radio link with a remote network.

20 Claims, 3 Drawing Sheets

METHOD OF SECURING NETWORK ACCESS RADIO SYSTEMS

FIELD OF THE INVENTION

The present invention relates to a method of securing network access radio systems from unauthorized users. In particular, the present invention relates to securing network access radio systems by restricting network access to verified access radios.

BACKGROUND OF INVENTION

Improvements in wireless communication technology have allowed users to easily access networks from remote locations. However, this convenience has come at a price and security has become a growing concern among customers and network providers. As wireless wide area and local area networks become more critical to core business functions, network security has become increasingly more important because of the far-reaching consequences of a breach in security. Essential, confidential business information residing on corporate networks must be easily accessible to numerous users within a corporation, while at the same time, protected from unauthorized users. When corporate networks can be wirelessly accessed from remote locations, the risks are significantly increased. Unauthorized intrusions into a corporate network can result in the theft of valuable corporate information, the corruption of files and data and/or the disruption of network service. No corporation can afford to risk such dire consequences.

Many networks that can be accessed via a wireless device employ encryption, passwords, verification of device types and other security measures to protect against access by an unauthorized third party. Other technologies and access methods can also contribute to network security. Spread spectrum technology, for example, is inherently secure, but it only provides a link level security. For infrastructure networks, manually entered keys or digital certificates may be used that are retained in the device. However, they can be compromised and they reduce the flexibility of installing new devices on the network or replacing devices already connected. Also, if communications based on the passwords, personal identification numbers (PINs) or digital certificates are intercepted during the connection process, these security measures may be bypassed by using the intercepted key exchange information.

Corporations have expressed concerns that radio systems, which are used to access corporate networks, are especially vulnerable to unauthorized users and they could jeopardize the security of confidential corporate information. A thief could easily gain unauthorized access to a corporation's private network by stealing an access radio with built in access authorization from an authorized user and using the stolen radio to log onto the network. Once logged onto the network, the unauthorized user would have unrestricted access and could change, download, destroy or infect operating systems and databases. This risk is the same for any company or government organization that operates a private or public network. Thus, the theft of an access radio and its unauthorized use to access a network's applications and/or information can seriously damage the operations of any organization.

By way of background, access radios connect a network (typically, an in-building LAN—"local area network") to a remote networks via a radio link—where the "other end" of the radio link is often a shared radio on a central antenna. LANs are high-speed, low-error data networks covering a relatively small geographic area (up to a few thousand meters), which connect workstations, peripherals, terminals, and other devices in a single building or other geographically limited area. LAN standards specify cabling and signaling at the physical and data link layers of the Open System Interconnection (OSI) model. Ethernet, Fiber Distributed Data Interface ("FDDI"), and Token Ring are widely used LAN technologies.

A network access radio is typically connected to a LAN and communicates with other devices on the LAN, such as servers, computers and databases. The access radio also communicates via a radio link with one or more remote networks and/or devices. In addition to communicating with other devices on the LAN and remote networks and/or devices, access radios can perform radio link security (similar to the security functions performed by a router), virtual local area network (VLAN) support functionality and power and/or network management functions. However, newer access radios are typically small and, therefore, can be easily removed from the LAN and from a building by a thief. The stolen access radio could then be operated by an unauthorized user from another location to access "secure" networks and devices. Accordingly, it is easy to understand why this risk has raised serious concerns with operators of networks with wireless access.

The risks involved with the theft and unauthorized use of an access radio makes it desirable to provide a method and apparatus for enhancing security in network access radio systems that does not impede access by authorized users and provides a level of security that is not compromised by the theft or unauthorized removal of an access radio.

SUMMARY OF THE INVENTION

In accordance with the present invention, a method of providing security for network access radio systems is provided. The method includes: connecting an access radio having a radio link and a first ping application to a network; communicating between the access radio and a processing device on the network using the first ping application; and disabling the radio link in response to a termination of ping communication between the access radio and the processing device. The processing device includes a second ping program that is substantially the same as first ping program and allows the processing device and the access radio to communicate using ping commands. A ping application can be a simple "heartbeat" check, or it can be as sophisticated as an encrypted, device specific, revolving key exchange mechanism.

In another embodiment of the present invention, the method of providing security for network access radio systems includes: providing a network having a network access radio that has a radio link, a device and a ping application for sending and receiving encrypted ping commands; sending and receiving ping commands between the device and the access radio; and enabling operation of the radio link when the access radio is receiving ping commands. Preferably, the encrypted ping commands include identifying information that is unique for each access radio.

The access radio and the device can be nodes on the network and the network can be a local area network (LAN) or a wide area network (WAN). The device is preferably a computer, a server or a router. Although, any device having a central processing unit (CPU) with sufficient processing capacity for executing the ping application, such as an alarm management system, can be used.

The ping application sends commands in the form of packets of information from the device to the access radio and receives a response from the access radio. Preferably, the ping communication includes an encrypted password or code that prevents unauthorized ping communications with the access radio. The access radio can support a file transfer protocol, which is used to send files. In preferred embodiments, the file transfer protocol can only transfer files when the ping application is operating. The ping application must be functioning (i.e., sending and receiving commands between the device and the access radio) when the access radio is communicating with one or more remote networks.

The present invention is also a secure access radio system that includes: a network; a device connected to the network; an access radio having a radio link connected to the network; and a ping application for sending and receiving ping commands between the device and the access radio. The device and access radio can be nodes on the network. The access radio can communicate with a remote device via the radio link when the ping application is sending and/or receiving ping commands, preferably in the form of packets of information. The preferred type of device is either a computer, a server or a router, but any device that includes a CPU with enough excess processing capacity to operate the ping application can be used. The secure access radio system can be used for a local area network (LAN) or a wide area network (WAN).

The preferred embodiments of the method of providing security for network access radio systems and the network access radio systems of the present invention, as well as other objects, features and advantages of this invention, will be apparent from the following detailed description, which is to be read in conjunction with the accompanying drawings.

BRIEF DESCRIPTION OF THE FIGURES

Other objects and many attendant features of this invention will be readily appreciated as the invention becomes better understood by reference to the following detailed description when considered in connection with the accompanying drawings wherein.

DETAILED DESCRIPTION OF THE INVENTION

Figure 1:
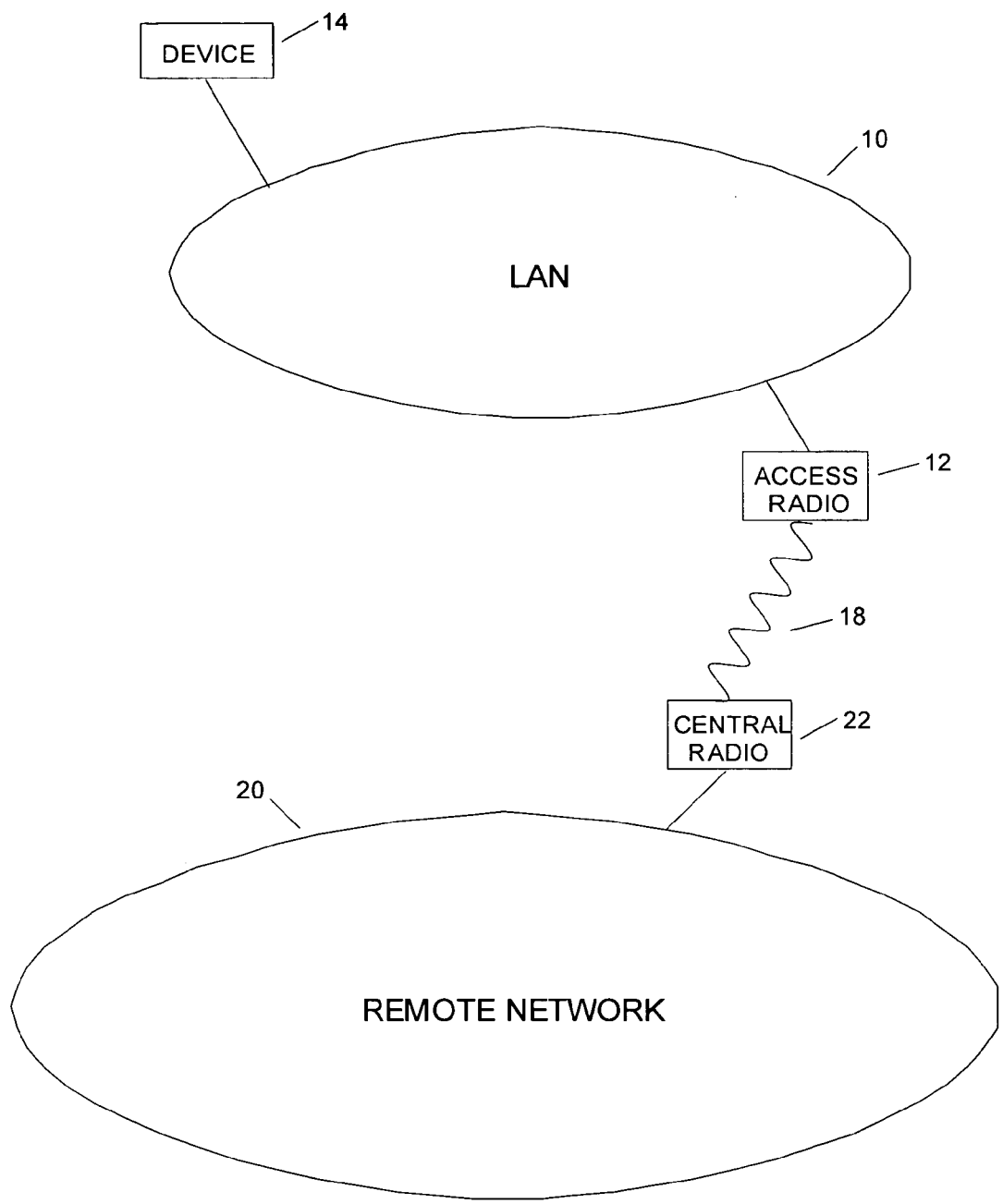
FIG. 1 is a drawing showing the connection of two networks using an access radio system.

The present invention relates to a method for providing security for networks that can be accessed using an access radio system and the access radio security systems that are used. Access radios connect a network (typically an in-building local area network or "LAN") to a remote network via a radio link. The access radio is usually a node on the network and the "other end" of the link can be a shared radio on a central antenna, which is also referred to as a "central radio." The central radio has the ability to talk to multiple subscriber radios by executing a multiple access protocol between itself and all the subscriber stations. These protocols are often time based (i.e., the radios take turns) but can also use any of a number of frequency or code based multiple access methodologies. Access radio systems are well known to those skilled in the art and are widely used to provide access to private, as well as public, networks. However, the theft of an access radio can compromise the network and all of the information accessible through the network. The present invention provides security for access radio systems by disabling the radio if it is removed from the network on which it resides.

The access radio security system of the present invention includes a program that is installed and runs on the access radio for a network, typically a LAN. This program communicates (using "pings") with a similar program running on a secured device (such as a computer, a server, a router or other device that has a central processing unit (CPU) with sufficient processing capacity to support the program) on the same network. (As used herein, the term "secured device" refers to a device on the network which cannot be compromised or accessed by unauthorized users.) A "ping request" determines whether the access radio is reachable at the current time from the secured device. As long as the hard-wired communication link between the access radio and the secured device is operating, the access radio will continue to function. If the connection between the access radio and the secured device is lost for any reason, the radio link of the access radio will be disabled and it will cease functioning. In preferred embodiments, the loss of the connection alerts network security and/or initiates an alarm. Accordingly, after the radio is disconnected or removed from the LAN by a thief or unauthorized person, it cannot be used in another location for unauthorized access to the network via the radio link.

The "ping" (Packet Internet or Inter-Network Groper) communication between the access radio and the secured device is supported by a ping program which is available on most networks as a standard diagnostic program. The term "ping" can be loosely interpreted to mean "to get the attention of" or "to check for the presence of" another party on the network. Ping is a basic network program that lets a user verify that a particular network address exists and can accept requests. Users and software processes employ ping to diagnostically ensure that a device, such as a host computer, that the user is attempting to reach is actually operating. The ping software utility sends an Internet Control Message Protocol (ICMP) packet to a specified Internet Protocol (IP) network address or a qualified domain name. (ICMP is an extension to the IP protocol that supports packets with error, control and informational messages.) The utility waits for replies from the address in response to receipt of the ICMP packet. Ping may also be used to communicate with an operating host in order to determine the amount of time required to receive a response from the host, as well as other related statistics.

For the purposes of the present invention, the verb ping means the act of using the ping utility or command. Ping is typically used as a diagnostic tool to ensure that a host computer on a network is actually operating. If, for example, a user can't ping a host, then the user will be unable to use the File Transfer Protocol (FTP) to send files to that host. A ping program tests network connectivity by sending data from one device on a network which is then echoed by another device. Preferably, the ping program is a separate, low level application that runs in parallel to the application layer in the protocol stack and is transparent to the application layer. The ping command is often executed using primarily the Media Access Control (MAC) layer protocol. Before a ping command is sent to a device, the user can configure the ping settings, such as number of packets, time to live, size, and timeout. In the present invention, the ping command has a specific protocol that must be present in order for the access radio to continue operating. This protocol provides security for the ping program so that it cannot be circumvented or "spoofed" by unauthorized users. For example, the protocol can include a specific code for the radio and/or location pair, either alone or together with other unique identification information. If this code is not correctly entered, the ping program will not be recognized by the access radio and the device and communication using ping commands will not be established.

In the present invention, a ping program is used to confirm the connectivity of an access radio to a device on the network on which they reside, typically a LAN. If the ping command confirms a valid connection of the access radio to the device via the LAN, the access radio is enabled and can continue to access a remote network via the radio link of the access radio. If the ping command "times out," that is, it does not confirm by a return ping command that the access radio is connected to the LAN within a specified period of time, the access radio is disabled and its radio link cannot be used to access the remote network. The ping program preferably includes an encrypted code, such as a password or a personal identification number. Preferred codes include key exchange/encrypted tunneling methodologies, which are well known to those skilled in the art. If the ping command from another device on the network to the access radio does not include the encrypted code, the access radio will not respond to the ping commands. Thus, the access radio must be connected to a dedicated network, and that connection must be verified by continuous coded ping communications, in order to operate. Once disconnected from the network and the ping communication with the other device on the network, the access radio cannot be used to access remote networks which may contain confidential information.

The present invention is a method of providing security for network access radio systems by establishing a continuous communication between an access radio connected to the network and another device on the network using a ping program. The access radio can only communicate via its radio link with a remote network or device while the ping communication continues. If the access radio does not receive a ping signal from the other device on the network within a specified period of time, the radio link is disabled. In order to provide additional security, the ping signal from the other device includes a unique code or identifier. The access radio will not acknowledge receipt of the ping if the code is absent. This prevents a thief from removing the access radio from the network and using it at another location to access confidential information on the remote network. Thus, the ping signals enable the operation of the radio link and ensure that the access radio can only operate when connected through a network to a device having the uniquely coded ping program.

The access radio communicates using the ping program with another permanent node on the network, preferably a computer, a server or a router. However, any device on the network with a CPU that is capable of supporting the ping program (i.e., the ping software application) can be used to communicate with the access radio. The access radio security system can be used on any network, but it is preferably used to connect a local area network (LAN) with a remote location; typically, a remote network.

The access radio security system of the present invention uses the ping program to continuously send packets of information back and forth over the network between the device and the access radio. At least one of these packets of information includes a code or identifier that is specific to the particular access radio. The access radio contains a software program which monitors the ping communications to verify that the access radio is physically connected to the network and has not been removed to another location. The ping program is set up to send a ping at an arbitrarily selected interval of time after a ping is received from the other device on the network. Therefore, if the program in the access radio, which monitors the ping communications, detects that a ping communication has not been received within the time limit, the program disables the radio link and/or sends a message to the network operator, preferably an alarm signal. However, as long as the access radio continues to communicate over the network with the other device using the ping program, the access radio is enabled and can function as a radio link with a remote network or device. In preferred embodiments, the device that communicates with the access radio over the network has a ping program with a clock which will time-out and alarm if the device does not receive a ping command within a specified period of time.

The secure access radio system of the present invention includes: a network; a device connected to the network; an access radio connected to the network; and a ping application for sending and receiving ping commands between the device and the access radio. The secure access radio system can be used for any network, such as local area networks (LANs) and wide area networks (WANs). The device and access radio are nodes on the network that communicate with each other over the network. The ping program is installed in both the access radio and the device. The device can be a computer, a server, a router or any other device that includes a CPU with sufficient capacity to operate the ping program. In preferred embodiments, the radio link of the access radio is only enabled when the ping program in the access radio is sending and receiving coded signals to and from the ping program in the device. The ping commands are preferably in the form of packets of information. In other embodiments, the loss of the ping signal between the access radio and the device will actuate an alarm to alert the network operator, but will not disable the radio link of the access radio.

Referring now to the figures, FIG. 1 shows a local area network (LAN) 10 that is connected to a remote network 20 using an access radio system. The LAN 10 has a plurality of nodes including an access radio 12 and a device 14. The device 14 hosts a ping application which continuously sends and receives ping commands to and from the access radio 12, which also hosts a ping application. As long as the access radio 12 continues to receive the ping commands, the access radio 12 will continue to communicate via the radio link 18 with the remote network 20. Typically, the remote network 20 includes a central radio 22 which communicates with the access radio 12 on the LAN 10. The signals received from the access radio 12 by the central radio 22 can then be connected to a wide area network 20, which in turn can connect to other locations.

The ping commands, which are sent between the device 14 and the access radio 12, enable the operation of the radio link 18 of the access radio 12. The access radio 12 includes a software program that disables the radio link 18 if the ping commands are not continuously received. If the ping commands are interrupted for more than a specified period of time, the software program in the access radio 12 disables communication with the remote network 20 via the radio link 18. Thus, the access radio 12 must be connected to the LAN 10 and continuously receive ping commands from the device 14 in order to function.

Figure 2:
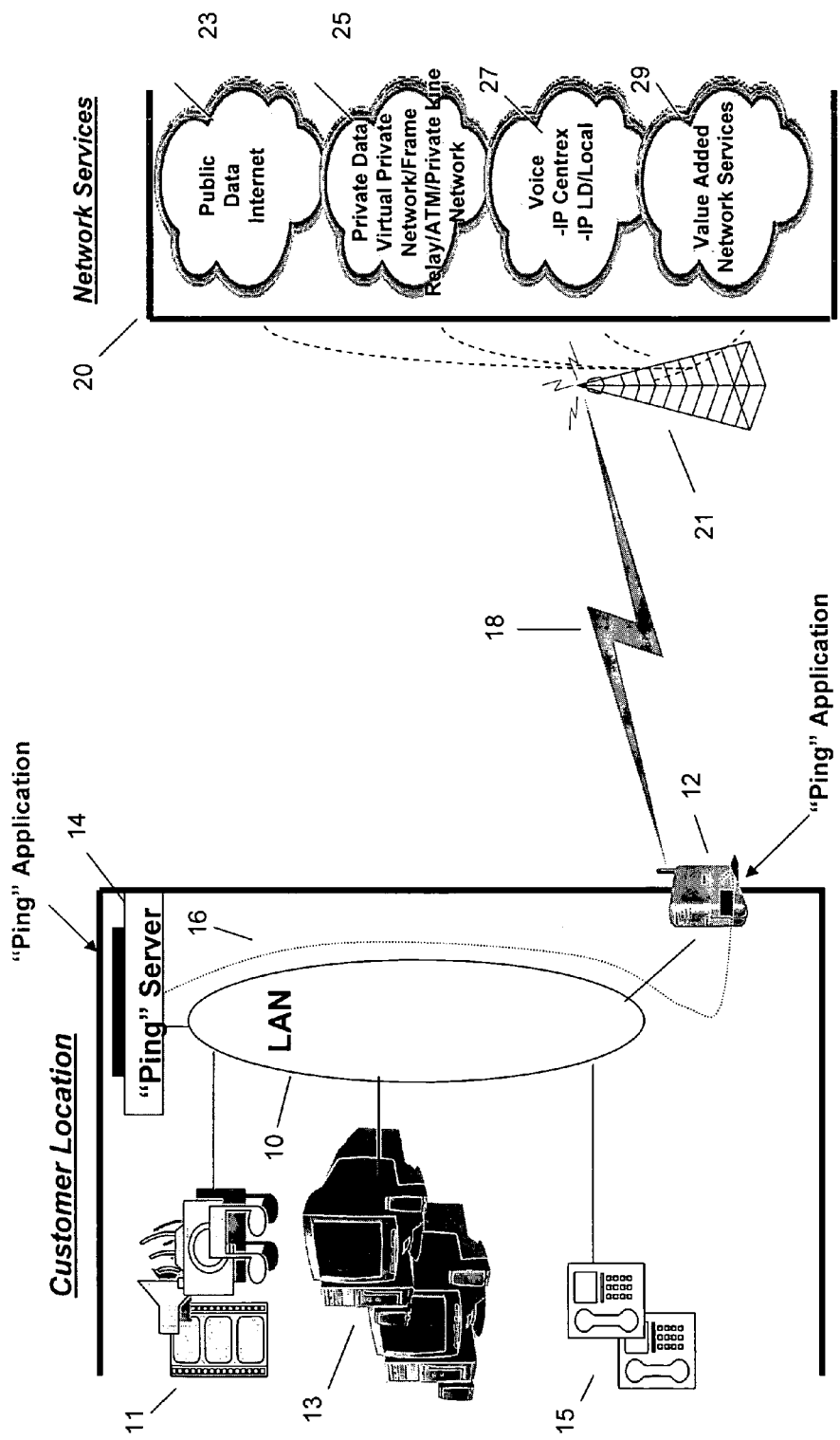
FIG. 2 is a drawing showing the connection of a local area network to a remote network using an access radio.

FIG. 2 is a drawing of a local area network (LAN) 10, which is connected by an access radio 12 via a radio link 18 to various services on a remote network 20. The LAN 10 includes a server 14 which hosts a ping application that sends and receives ping commands 16 to and from the ping application on the access radio 12. In addition, the LAN 10 can include other devices, such as data storage devices 11, computer workstations 13 and telephone systems 15. When the ping application in the access radio 12 is sending and receiving ping commands 16 to and from the ping application in the server 14, the radio link of the access radio 12 is enabled and can communicate via the radio link 18 with the remote network 20.

FIG. 2 shows the access radio 12 communicating via the radio link 18 with a common antenna 21 for a variety of services on the network 20 that can include public data 23, private data 25, voice communications 27 and value added network services 29. The radio link 18 to the services of the network 20 is only available to the LAN 10 through the access radio 12. If the ping commands 16 are not received within a specified time interval, the access radio 12 is disabled and the LAN 10 can no longer access the services of the network 20 via the radio link 18.

Figure 3:
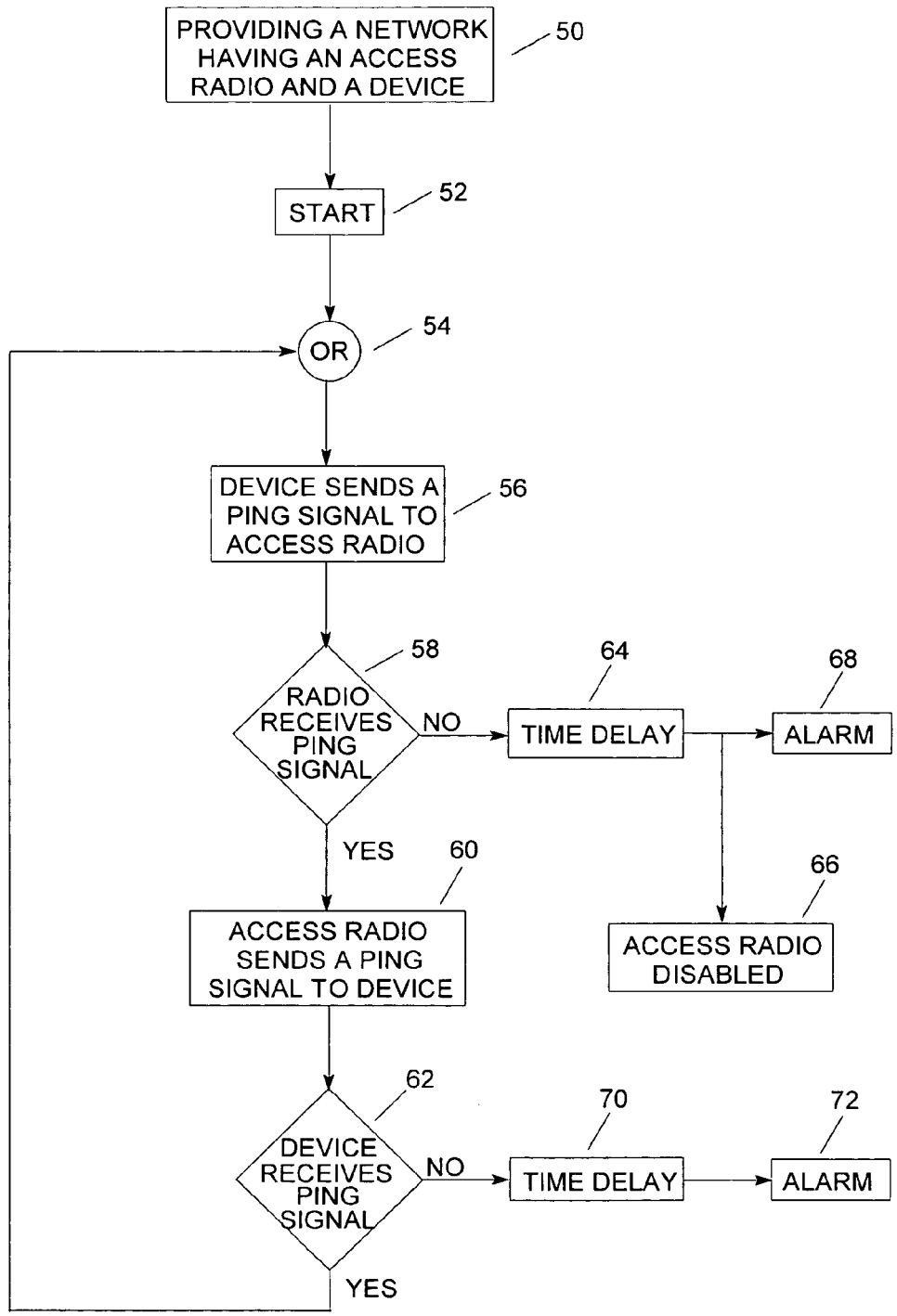
FIG. 3 is a flow chart of the method of securing a network access radio system.

FIG. 3 is a flow chart of the method of securing a network access radio system, which includes providing a network having an access radio and a device, such as a computer or a server, in step 50. The device sends a ping signal in step 56 to the access radio either when the access radio security system is started in step 52 or (step 54) after the device receives a ping signal in step 62 from the access radio. If the access radio receives the ping signal in step 58, it sends a ping signal back to the device in step 60. If the access radio does not receive the ping signal in step 58, after a time delay in step 64, the access radio is disabled in step 66 and an alarm is initiated in step 68.

If the device receives the ping signal from the access radio in step 62, the device sends a ping signal to the access radio in step 56. If the device does not receive the ping signal in step 62, after a time delay in step 70, an alarm is initiated in step 72. As long as the device and the access radio continue to send and receive ping signals from one another in steps 56, 58, 60 and 62, the access radio is enabled and can communicate with a remote network via the radio link. However, if a ping signal is not received by the access radio after a time delay in step 64, the access radio will be disabled and cannot communicate with the remote network until it is reactivated by the network operator.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

What is claimed is:

1. A method of providing security for network access radio systems comprising:
    connecting an access radio to a network, the access radio comprising a radio link and a first ping application, wherein the first ping application is a continuous ping communication having a verified unique code or identifier in order to operate;
    communicating between the access radio and the network using the radio link;
    communicating between the access radio and a processing device on the network using the first ping application; and
    disabling the radio link in response to a termination of ping communication between the access device and the processing device.

2. The method of providing security for network access radio systems according to claim 1, wherein the network is a local area network (LAN) or a wide area network (WAN) and wherein the access radio and the device are nodes on the network.

3. The method of providing security for network access radio systems according to claim 1, wherein the processing device comprises a second ping application.

4. The method of providing security for network access radio systems according to claim 3, wherein the first and second ping applications send packets of information between the processing device and the access radio.

5. The method of providing security for network access radio systems according to claim 1, wherein the access radio has a file transfer protocol, and wherein the file transfer protocol can only transfer files when the first ping application is operating.

6. The method of providing security for network access radio systems according to claim 3, wherein the first and second ping applications include a unique code for the access radio.

7. The method of providing security for network access radio systems according to claim 6, wherein the unique code includes a key exchange/encrypted tunneling methodology.

8. The method of providing security for network access radio systems according to claim 1, wherein the processing device is a computer, a server or a router.

9. The method of providing security for network access radio systems according to claim 1, wherein the access radio communicates with a remote access radio or a remote network.

10. The method of providing security for network access radio systems according to claim 3, wherein the first and second ping applications include commands and wherein the commands are in the form of packets of information.

11. A method of providing security for network access radio systems comprising:
    providing a network comprising a network access radio having a radio link, a device and a ping application for continuously sending and receiving encrypted ping commands having a verified unique code or identifier in order to operate;
    communicating between the access radio and the network using the radio link;
    sending and receiving encrypted ping commands between the device and the access radio; and
    enabling operation of the radio link when the access radio is receiving encrypted ping commands.

12. The method of providing security for network access radio systems according to claim 11, wherein the encrypted ping commands are in the form of packets of information and include a unique code for the access radio.

13. The method of providing security for network access radio systems according to claim 11, wherein the device is a computer, a server or a router.

14. The method of providing security for network access radio systems according to claim 11, wherein the device comprises a central processing unit (CPU).

15. A secure access radio system comprising:
    a network:
    a device connected to the network;
    an access radio comprising a radio link connected to the network, wherein the radio link is used for communications between the access radio and the network; and
    a ping application for continuously sending and receiving ping commands between the device and the access radio;
    wherein the ping command having a verified unique code or identifier in order to operate;
    wherein the radio link is operative only when the ping application is receiving ping commands.

16. The secure access radio system according to claim 15, wherein the device comprises a central processing unit (CPU).

17. The secure access radio system according to claim 15, wherein the network is a local area network (LAN) or a wide area network (WAN).

18. The secure access radio system according to claim 15, wherein the device is a computer, a server or a router.

19. The secure access radio system according to claim 15, wherein the device and access radio are nodes on the network.

20. The secure access radio system according to claim 15, wherein the ping commands are in the form of packets of information and include a code for the access radio.

* * * * *